(12) United States Patent
Hruska et al.

(10) Patent No.: US 12,291,291 B2
(45) Date of Patent: May 6, 2025

(54) SEGMENTED WHEEL

(71) Applicant: AGCO Corporation, Duluth, GA (US)

(72) Inventors: Derek D. Hruska, Lime Springs, IA (US); Alan D. Gustafson, Lakefield, MN (US)

(73) Assignee: AGCO Corporation, Duluth, GA (US)

( * ) Notice: Subject to any disclaimer, the term of this patent is extended or adjusted under 35 U.S.C. 154(b) by 870 days.

(21) Appl. No.: 17/293,016

(22) PCT Filed: Aug. 19, 2019

(86) PCT No.: PCT/IB2019/056973
§ 371 (c)(1),
(2) Date: May 11, 2021

(87) PCT Pub. No.: WO2020/099946
PCT Pub. Date: May 22, 2020

(65) Prior Publication Data
US 2021/0394838 A1    Dec. 23, 2021

Related U.S. Application Data

(60) Provisional application No. 62/760,676, filed on Nov. 13, 2018.

(51) Int. Cl.
*B62D 55/14* (2006.01)
*B62D 55/12* (2006.01)

(52) U.S. Cl.
CPC ............ *B62D 55/14* (2013.01); *B62D 55/12* (2013.01)

(58) Field of Classification Search
CPC ............ B62D 55/12; B62D 55/14; B60B 3/16
See application file for complete search history.

(56) References Cited

U.S. PATENT DOCUMENTS

| | | | | |
|---|---|---|---|---|
| 1,391,719 A | * | 9/1921 | Conyngham | F16H 55/12 474/95 |
| 4,058,023 A | * | 11/1977 | Smith | F16H 55/12 474/902 |
| 4,449,756 A | * | 5/1984 | Weeks | B60B 7/0006 301/37.42 |
| 4,950,030 A | * | 8/1990 | Kindel | B60B 3/005 305/137 |
| 6,652,043 B2 | * | 11/2003 | Oertley | B62D 55/0963 305/195 |
| 7,198,337 B2 | * | 4/2007 | Deckler | B60B 3/041 305/195 |
| D644,670 S | * | 9/2011 | Barrelmeyer | D15/28 |

(Continued)

FOREIGN PATENT DOCUMENTS

GB    2 435 867 A    9/2007

OTHER PUBLICATIONS

European Patent Office, International Search Report for related International Application No. PCT/IB2019/056973, mail date Jan. 13, 2020.

*Primary Examiner* — Jason R Bellinger (57) ABSTRACT

A wheel for use with an endless track system includes at least three substantially identical segments. Each of the segments has a support portion, a circumferential flange, and a rim portion. The rim portion is affixed to an outer face of the circumferential flange. The segments are attached to each other to form the wheel. Methods of forming a wheel are also described.

18 Claims, 10 Drawing Sheets

(56) References Cited

U.S. PATENT DOCUMENTS

| | | | | |
|---|---|---|---|---|
| 8,191,593 B2* | 6/2012 | Mayer | ................... | B29D 30/02 |
| | | | | 152/209.15 |
| 8,672,064 B2* | 3/2014 | Korus | ................... | B62D 55/12 |
| | | | | 180/9.26 |
| 8,678,054 B2* | 3/2014 | MacPherson | ............. | B60C 7/08 |
| | | | | 152/306 |
| 9,033,431 B1* | 5/2015 | Zuchoski | ............... | B62D 55/08 |
| | | | | 305/130 |
| 2004/0017109 A1* | 1/2004 | Deland | ................. | B62D 55/13 |
| | | | | 305/199 |
| 2012/0241531 A1* | 9/2012 | Werner | ................ | A01G 25/092 |
| | | | | 157/1.1 |
| 2019/0351957 A1 | 11/2019 | Zuchoski et al. | | |

\* cited by examiner

SEGMENTED WHEEL

CROSS-REFERENCE TO RELATED APPLICATIONS

This application is a national phase entry under 35 U.S.C. § 371 of International Patent Application PCT/IB2019/056973, filed Aug. 19, 2019, designating the United States of America and published in English as International Patent Publication WO 2020/099946 A1 on May 22, 2020, which claims the benefit of the filing date of U.S. Provisional Patent Application 62/760,676, "Segmented Wheel," filed Nov. 13, 2018; the entire disclosure of each of which is incorporated herein by reference.

FIELD

The present disclosure relates to wheels for use with endless track systems on vehicles. In particular, endless track systems may be used to propel agricultural machines, for example tractors or combine harvesters.

BACKGROUND

Endless track systems are frequently used on agricultural vehicles when increased levels of traction are required or when it is desired to reduce the point load on the ground, i.e., to reduce surface compaction of soil.

Endless track systems employ a number of wheels around which a rubber or metallic track system runs. Some of the aforementioned wheels are unpowered, for example idler wheels, and other wheels are driven by the prime mover of the vehicle, i.e., drive wheels.

Conventionally the drive wheels of an endless tracked system are larger than the idler wheels. In some cases, the drive wheels have an elastomeric surface around the outer edge of the drive wheel that increases friction with the inside or running surface of the endless track and also prevent damage or excessive wear and reduction in noise of the overall system.

Some of the wheels of endless track systems are of such a diameter that the application of the elastomeric surface requires the entire wheel to be enclosed in a mold or else require other large expensive tooling to apply the elastomeric or rubber surface.

Endless track systems either use a positive drive method or friction drive method as the primary means to transfer the torque from the drive wheel/sprocket to the belt.

The positive drive method physically engages the innerside of the tracks at guide blocks.

The friction drive track system typically comprises a drive wheel or wheels that have an elastomeric material bonded and/or attached to the outside perimeter of the wheel. This elastomeric material allows for better friction characteristics between the drive wheel and the track carcass.

Most drive wheels are formed from a continuous sheet of steel, which requires expensive tooling to produce, and is difficult to hold close tolerances in larger sizes.

In order to achieve the necessary load capability characteristics, formed steel drive wheels often require an outer lip, and the outer lip can often trap dirt and debris, which is unfavorable.

This dirt and debris slides inside the wheel when it rotates, which typically wears away paint, leading to rust formation.

An additional issue with current-designed drive wheels is the high cost for the tooling to mold the necessary elastomer around the outer perimeter of the wheel.

Furthermore, if damage occurs to a localized portion of the wheel or elastomer, the entire drive wheel needs to be replaced.

As such it is desirable to reduce the size of molds or else other tooling required to apply the elastomer to the wheel. Furthermore, with conventional manufacturing techniques, it is difficult to locally thicken and therefore strengthen locations of a wheel.

The objective of this disclosure is to provide a solution to one or more of the above mentioned problems.

BRIEF SUMMARY

Accordingly, there is provided a wheel for use with an endless track system. The wheel comprises at least three segments, each of which is substantially identical. Each of the segments comprises a support portion, a circumferential flange, and a rim portion, wherein the rim portion is affixed to an outer face of the circumferential flange.

Advantageously, providing a segmented wheel, each of the segments can be processed individually, therefore reducing the overall size of tooling required to apply an elastomeric coating to an outer face of the segments. This reduces manufacturing costs. Furthermore, by constructing a wheel from segments localized, thickening of the segments can be included more easily.

Advantageously, the rim portion may be an elastomer.

An elastomeric rim portion reduces damage to an endless track and dampens the noise of the system.

Advantageously, the rim portion may be bonded to the outer face.

Bonding the rim portion to the outer face provides a durable connection of the rim portion to the rest of the wheel.

Advantageously, the segments may be configured to attach to each other thereby forming the wheel.

This means that a wheel can be constructed from a number of smaller sub components, i.e., segments that require smaller tooling than an entire wheel.

Advantageously, each segment may further comprise an inner edge, and the inner edge may be configured for attachment to a hub portion or an axle flange.

This allows the assembled wheel to be attached directly to the axle of a vehicle.

Advantageously, the inner edge may be bolted to the hub portion or axle flange.

This means that the assembled wheel may be removably attached to an axle using conventional fasteners, i.e., bolts.

Advantageously, each segment may be configured to be bolted to each adjacent segment.

Bolting each segment to an adjacent segment increases the overall strength and durability of an assembled wheel.

Advantageously, each segment includes corresponding interlocking formations configured to join each segment to an adjacent segment.

Using interlocking formations removes the requirement for further componentry to be used to attach the segments to each other. However, it will be understood that to further strengthen the joint or interface between adjacent segments, conventional fasteners may be used in addition to the interlocking formations.

Advantageously, each segment may further comprise an inner face of the circumferential flange, and wherein the inner face is provided with a debris ejection formation at the interface of two segments.

Debris ejectors assist in clearing the wheel of debris during use and therefore improve the durability of the endless track system and its efficiency by keeping the system clear of the debris.

Advantageously, the rim portion may further comprise an exterior face for contact with an endless track, wherein the exterior face comprises a plurality of grooves. The grooves eject debris caught between the wheel and endless track.

These grooves further assist in clearing debris that may become lodged between the wheel and the endless track when a vehicle is in use, for example small stones or mud. By keeping the endless track system clear of debris, the endless track system can function as designed.

Advantageously, the plurality of grooves may be arranged such that a groove at the interface of two segments bridges the adjacent segments uninterrupted.

By using a groove pattern or profile which has a pitch and frequency of grooves that allows the groove pattern or profile to be continuous once the wheel is assembled, the grooves can function as intended and allow for each segment of the wheel to be identical, thus reducing part cost through increased production volume of a given part.

Producing a wheel in segments allows for localized strengthening of the wheel in high-stress areas. Also, since each section is considerably smaller than a whole wheel, the tooling expense to mold and/or bond the outer elastomer is much less. Lastly, the joints between each section can create a raised feature that helps to eject dirt/debris from the inside of the wheel.

BRIEF DESCRIPTION OF THE DRAWINGS

Embodiments will now be described, by way of example only, with reference to the accompanying drawings, in which.

DETAILED DESCRIPTION

The drawings are provided by way of reference only, and will be acknowledged as not to scale.

Figure 1:
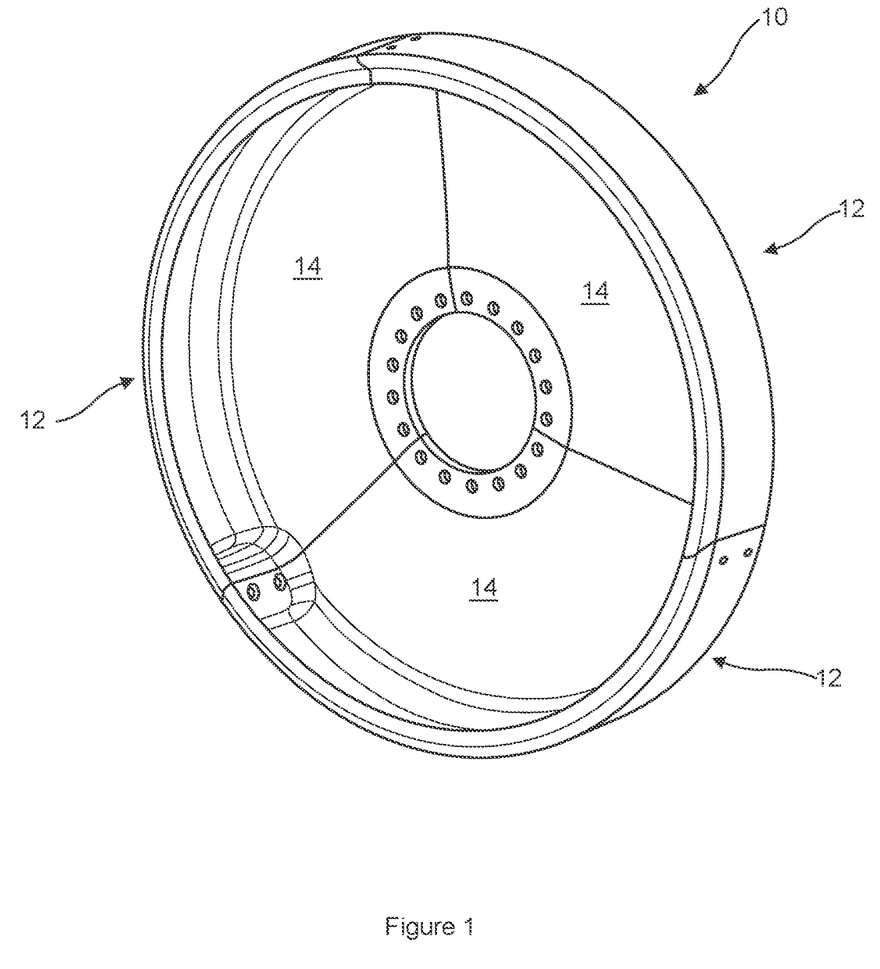
FIG. 1 is a perspective view of a segmented wheel according to a first embodiment.
Figure 2:
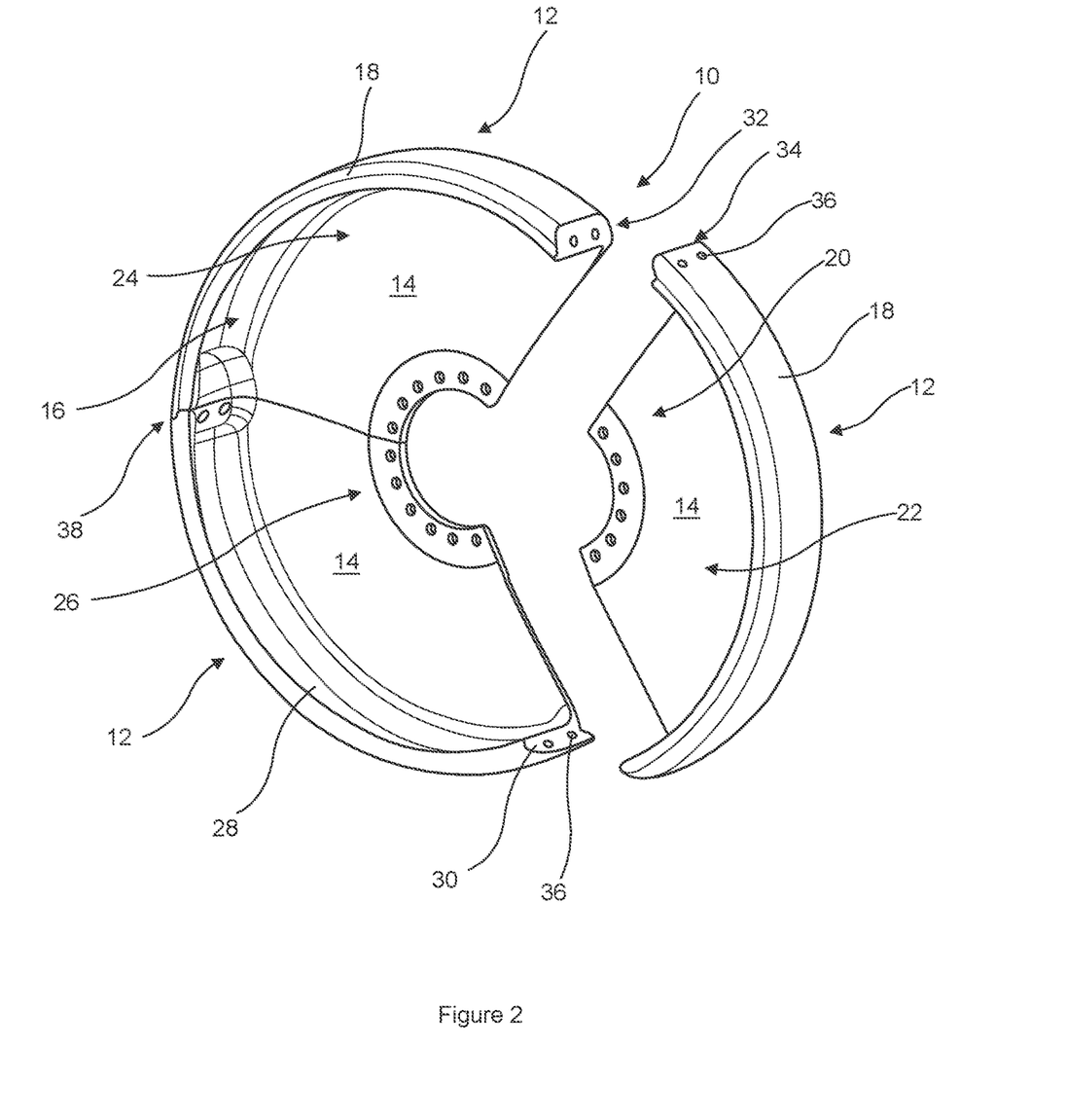
FIG. 2 is a partially exploded view of the wheel of FIG. 1.

FIG. 1 and FIG. 2 show a wheel 10 for an endless track system. In this embodiment the wheel 10 has three segments 12.

Each of the segments 12 is substantially identical.

Each segment 12 comprises a support portion 14 and a rim portion 18.

The support portion 14 is an annular sector in shape having a central connection portion 20, a body portion 22, an outer portion 24, and a circumferential flange 16.

The central connection portion 20 is configured for connection to an axle flange or the like by any suitable means, for example by bolts inserted through bolt holes 26 and attached to an axle flange or hub (not shown). Alternatively the connection portion 20 may be connected to a hub disc (not shown) which is in turn attached to an axle.

The body portion 22 extends radially outward from the central connection portion 20, becoming the outer portion 24. In this specific example, the body portion 22 is substantially flat; in other examples, the body portion 22 may include localized thickening of material for strengthening and/or apertures to reduce the overall segment 12 weight.

The circumferential flange 16 comprises an inner face 28, an outer face 30 and an interface portion 32 at each end of the circumferential flange 16. The circumferential flange 16 extends seamlessly from the outer portion 24 substantially perpendicularly to the plane of the body portion 22.

The outer face 30 provides a surface for attachment of the rim portion 18 and faces away from the axis of rotation of the wheel 10.

Each interface portion 32 abuts with the interface portion 32 of an adjacent segment 12 when the segments 12 are connected to form the wheel 10. The interface portion 32 in this specific example includes corresponding chamfered faces 34 and fastener holes 36 for bolts.

The interface portion 32 may include any suitable means for securing adjacent segments 12 together, for example welding, riveting, or adhesive bonding.

The inner face 28 faces toward the axis of rotation of the wheel 10.

The inner face 28 includes debris ejectors 38. The debris ejectors 38 are configured to urge debris collecting on the inner face 28 away from the plane of the body portion 22, thereby helping to reduce debris accumulation on the wheel 10. In this example, the debris ejectors 38 bridge the interface portion 32 of the circumferential flange 16; however, in other examples the debris ejectors 38 may be provided on the inner face 28 distanced from the interface portions 32, or may be omitted entirely. In this specific example, the debris ejectors 38 provide for localized thickening and strengthening of the circumferential flange 16 thereby strengthening the fastener holes 36 and therefore the arrangement of the segments 12 when connected to form the wheel 10.

The support portion 14 and the circumferential flange 16 in this specific example are a single metallic component, for example pressed mild steel; however, they may be two separate components which are joined together or a single spun or molded or pressed component. It will be understood that any suitable forming process may be used.

The rim portion 18 is of an elastomeric material and is attached using any suitable means to the outer face 30 of the circumferential flange 16.

In use, the wheel 10 is mounted to a vehicle, for example an agricultural tractor, the wheel 10 either supporting and/or driving an endless belt system to propel the vehicle. The rim portion 18 contacts the inside face of an endless track (not shown).

Since the wheel 10 is constructed of segments, the molds used to apply the rim portion 18 to the support portion 14 can be much smaller than the mold size that would be required to apply a rim portion 18 to a wheel that was not constructed of sub-segments.

By reducing the size of molds and tooling required to apply the rim portion 18 to the support portion 14, the overall cost of manufacture of the wheel 10 can be reduced.

With reference to FIGS. 3 through 10, a further embodiment is shown. A wheel 110 for an endless track system comprises five segments 112 and a hub portion 113, which is also known as a hub disc.

Figure 3:
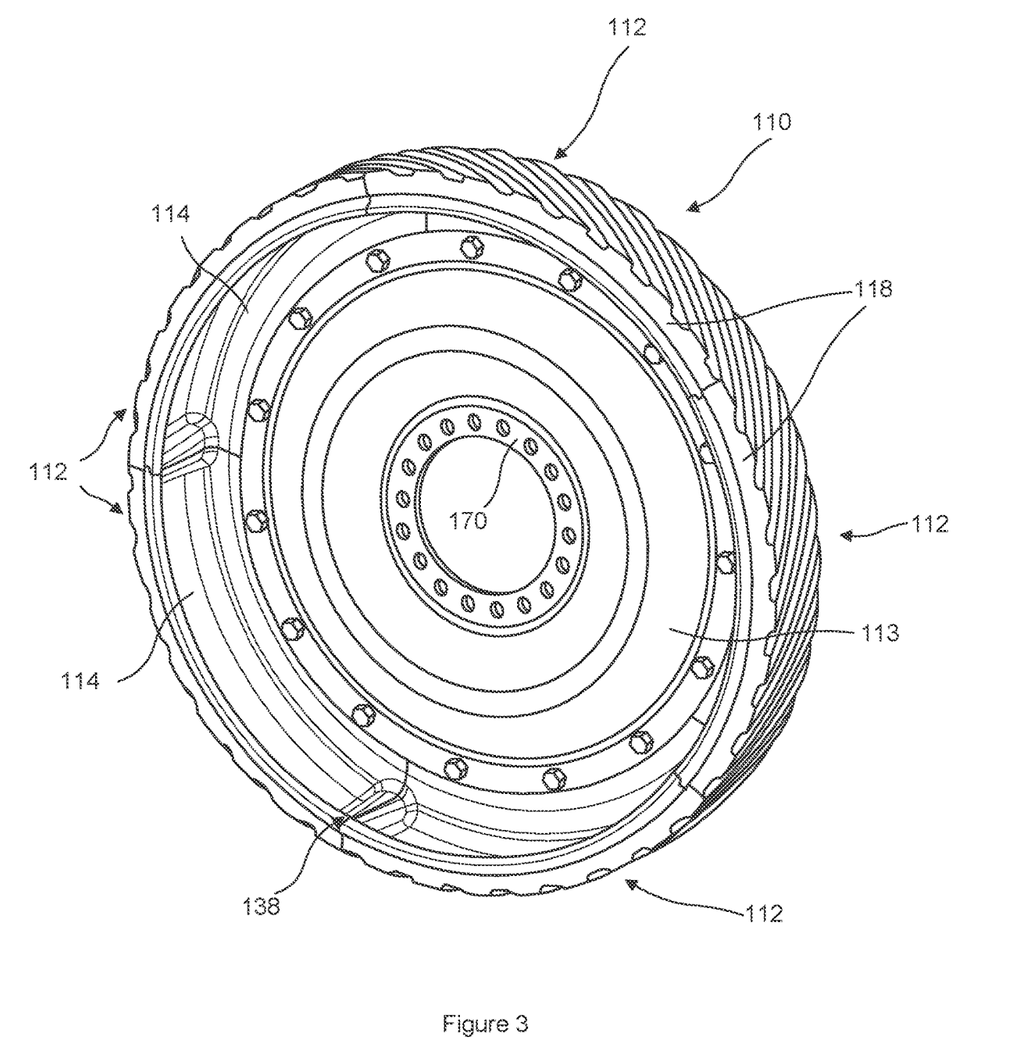
FIG. 3 is a perspective view of a segmented wheel according to a further embodiment.
Figure 4:
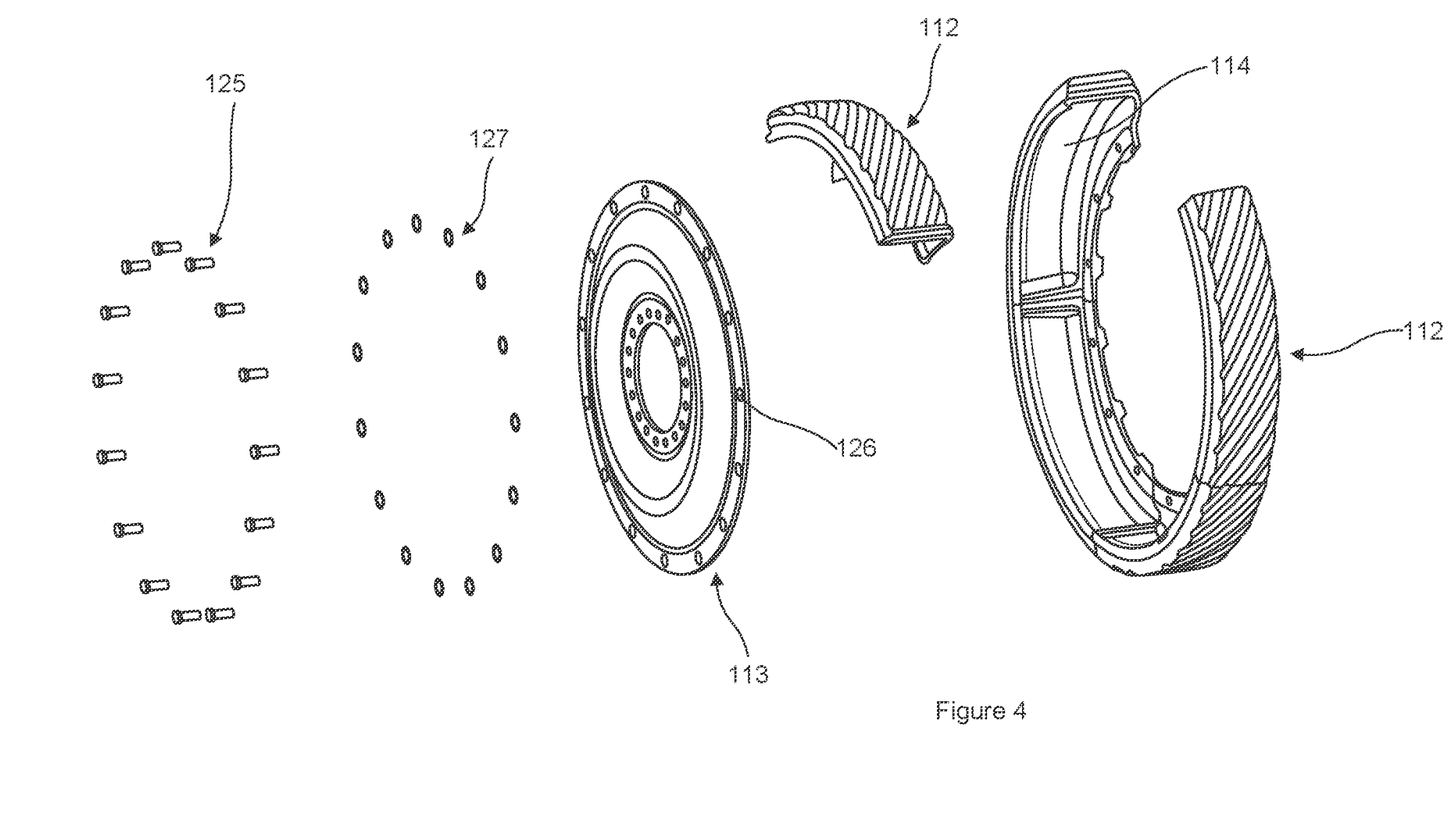
FIG. 4 is an exploded view of the wheel of FIG. 3.

The hub portion 113 is generally disc shaped and comprises a number of fastener holes suitable for the attachment of the segments 112 to the disc. The hub portion 113 includes a central flange 170, which is provided for the attachment of the hub portion 113 and thereby the wheel 110 to the axle (not shown) of a vehicle.

Each of the five segments 112 is substantially identical and each comprises a support portion 114 and a rim portion 118. Although five segments 112 are shown in this embodiment, it will be understood that fewer or more segments may be used depending on the application and preferred construction of the wheel 110.

The support portions 114 comprise a central connection portion 120, a body portion 122, an outer portion 124, and a circumferential flange 116.

The central connection portion 120 is configured for connection to the hub portion 113 by any suitable means, for example bolts 125 inserted through bolt holes 126. Washers 127 may be held under the head of the bolts 125 in a conventional manner.

The body portion 122 extends radially outward from the central connection portion 120, terminating at the outer portion 124, thereby forming an arcuate member. In this specific example, the body portion 122 includes localized thickening 129 of material for strengthening in proximity to the bolt holes 126.

The circumferential flange 116 comprises an inner face 128, an outer face 130, and an interface portion 132 at each end of the circumferential flange 116. The circumferential flange 116 is in this embodiment an extension of the outer portion 124 extending substantially perpendicularly to the plane of the body portion 122 and outer portion 124.

The outer face 130 provides a surface for attachment of the rim portion 118 and is orientated to face away from the axis of rotation of the wheel 110.

Each interface portion 132 in this specific example includes corresponding, interlocking formations 150. The interlocking formations 150 are best seen individually in FIGS. 9 and 10 and in FIG. 6, which shows the interlocking formations 150 in an engaged position. In the engaged position, the tongue 152 of one segment 112 interlocks with the groove 154 of another segment 112 to secure adjacent segments 112 relative to each other.

Figure 5:
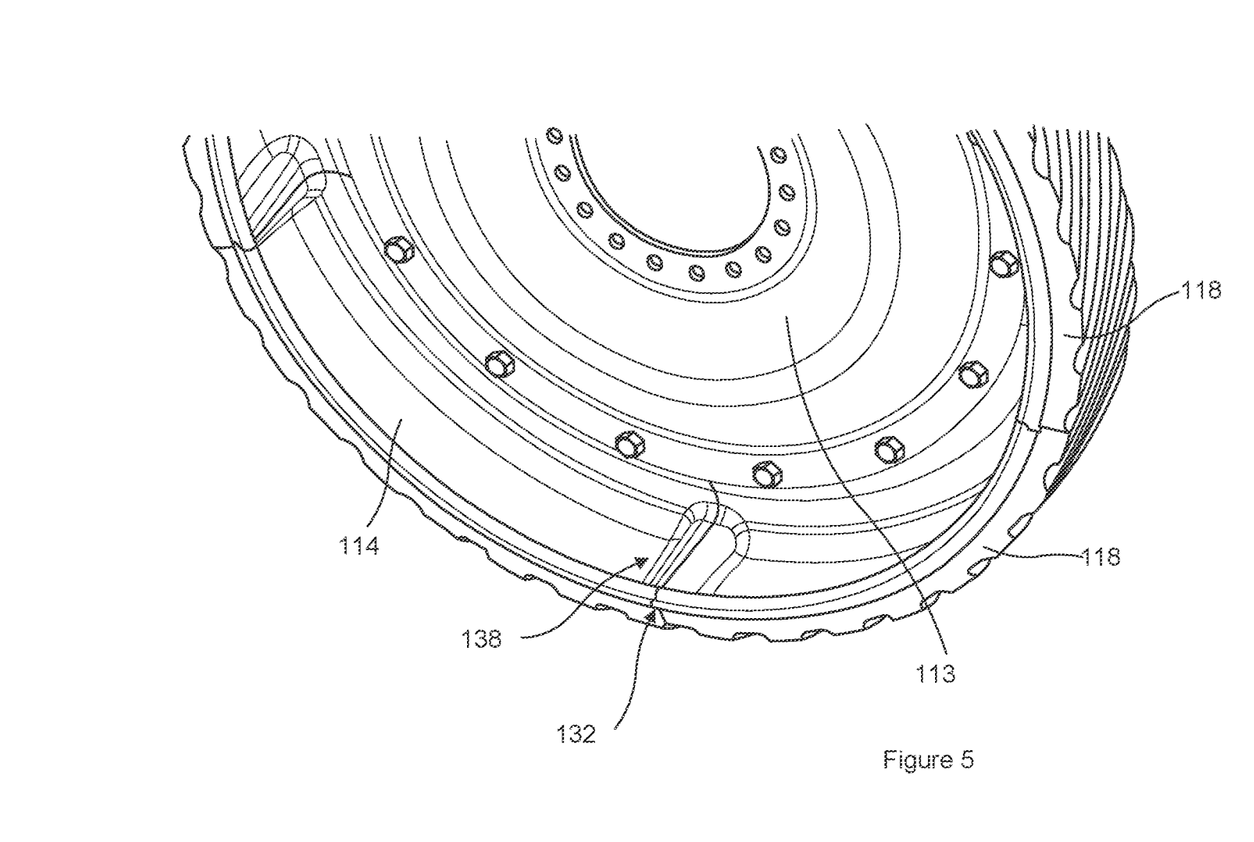
FIG. 5 is a close up view of the wheel of FIG. 3.

The inner face 128 may include debris ejectors 138. The debris ejectors 138 are configured to propel debris that may collect on the inner face 128 out of the wheel 110 and away from a vehicle, thereby helping to reduce debris accumulation on the wheel 110. With reference to FIG. 5, the debris ejectors 138 are formed from two parts, one on either side of the interface portion 132 of the circumferential flange 116. However, in other examples, the debris ejectors 138 may be provided on the inner face 128 away from the interface portions 132, or may be omitted entirely. In this specific example, the debris ejectors 138 are formed from localized thickening of the circumferential flange 116 and also act to strengthen the interface between adjacent segments 112.

The support portion 114 and the circumferential flange 116 are in this embodiment a single component of pressed mild steel; however, they may be two separate components which are joined together or a single spun or molded or pressed component. It will be understood that any suitable forming process may be used to manufacture the support portions 114.

The rim portion 118 is affixed to the outer surface 130 by any suitable means, for example by over molding or bonding. Generally the rim portion 118 is constructed of an elastomeric material.

Figure 6:
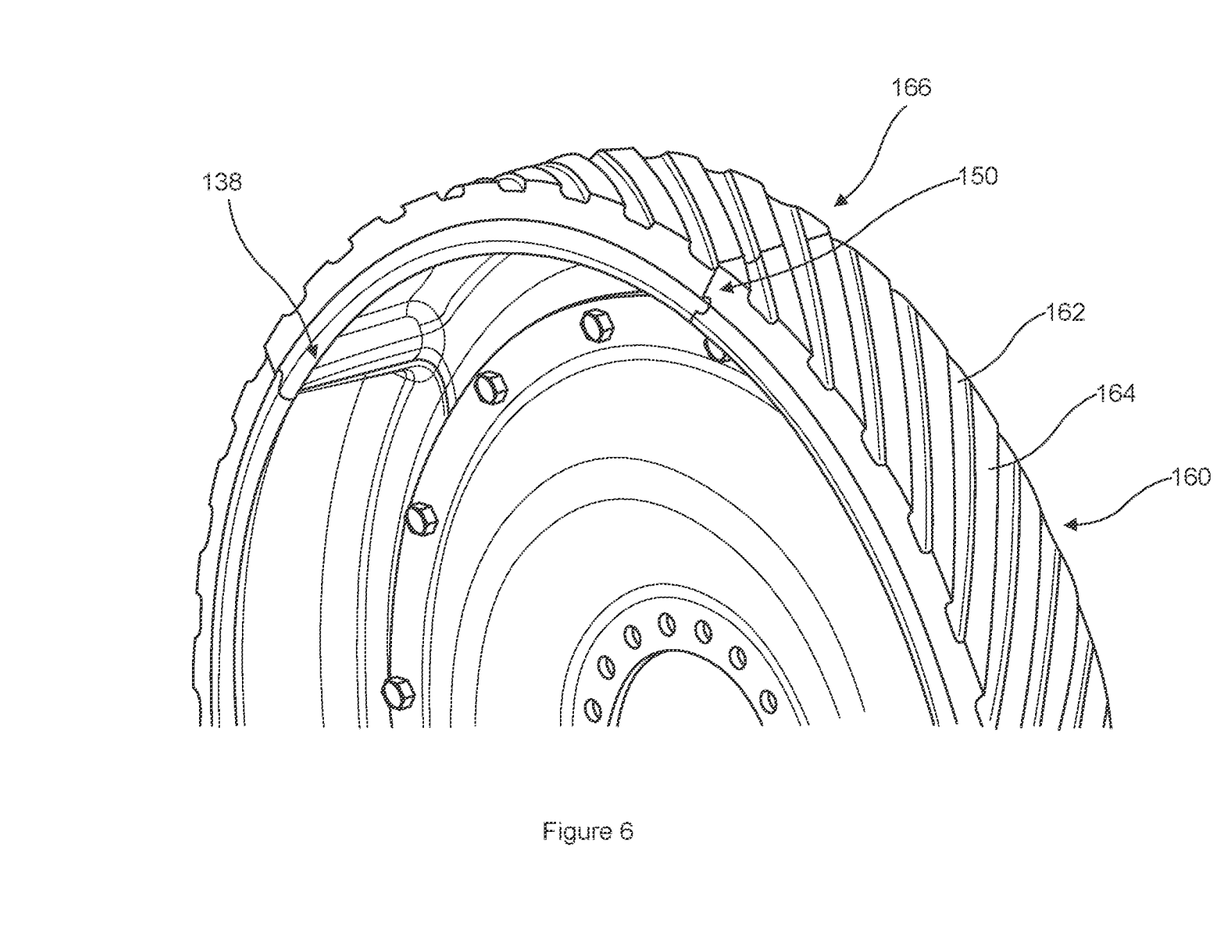
FIG. 6 is a further close up view of the wheel of FIG. 3.
Figure 7:
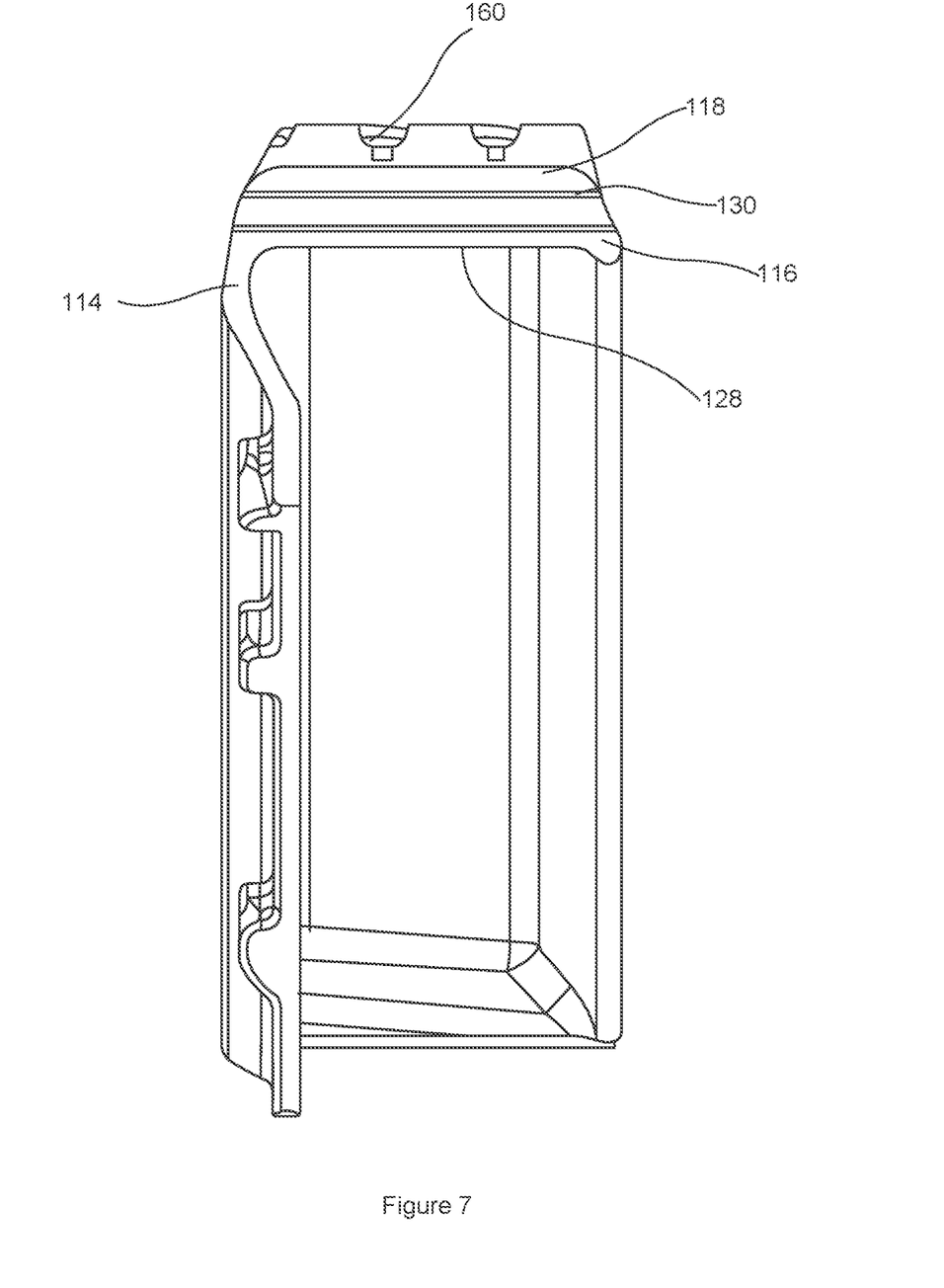
FIG. 7 is an end view of a segment of the wheel of FIG. 3.
Figure 8:
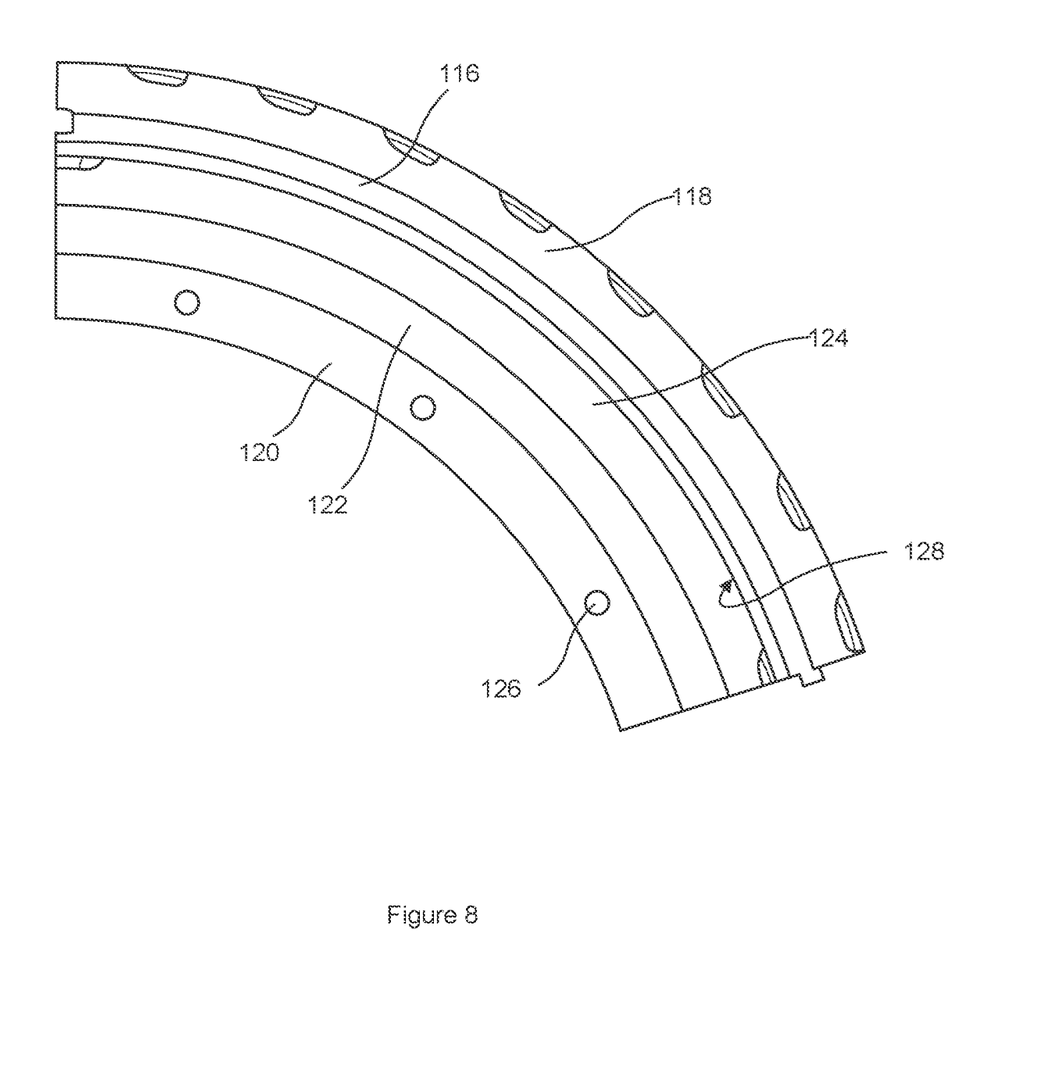
FIG. 8 is a side view of the segment of FIG. 7.
Figure 9:
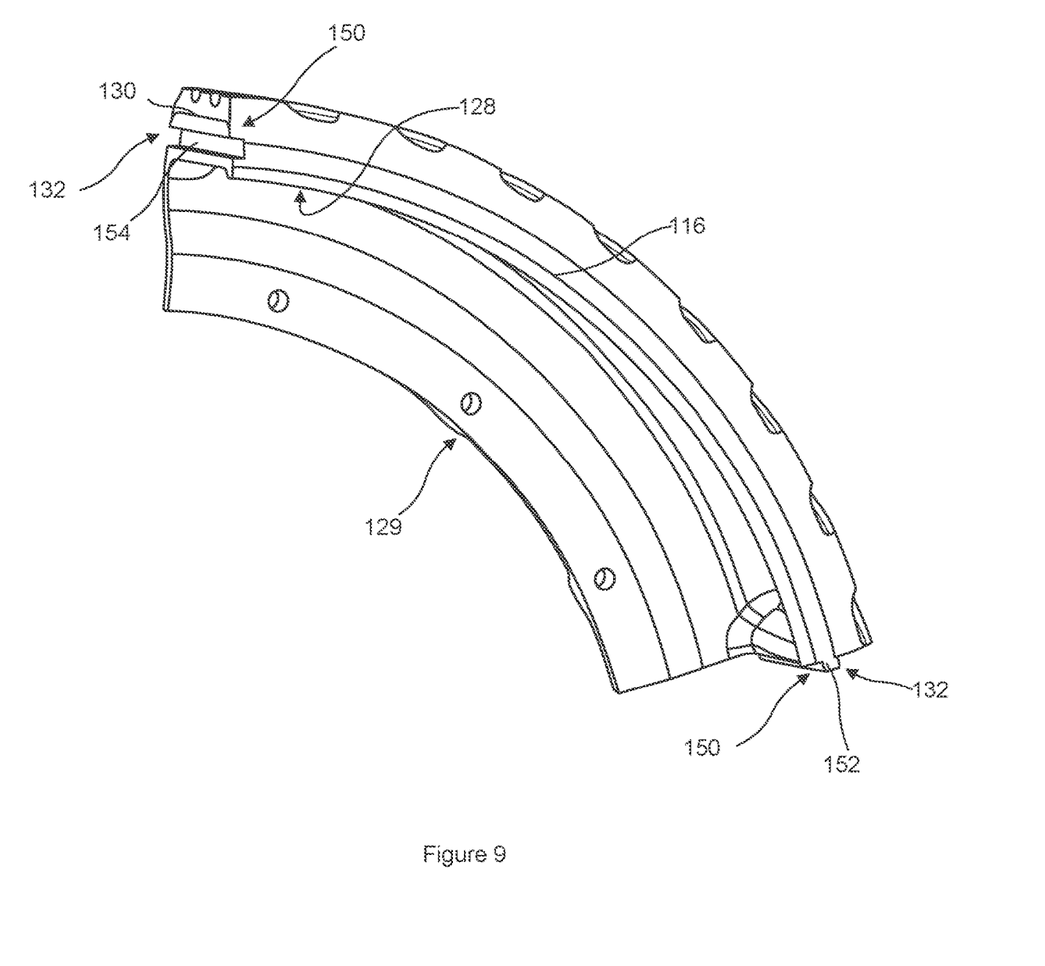
FIG. 9 is a perspective view of the segment of FIG. 7.
Figure 10:
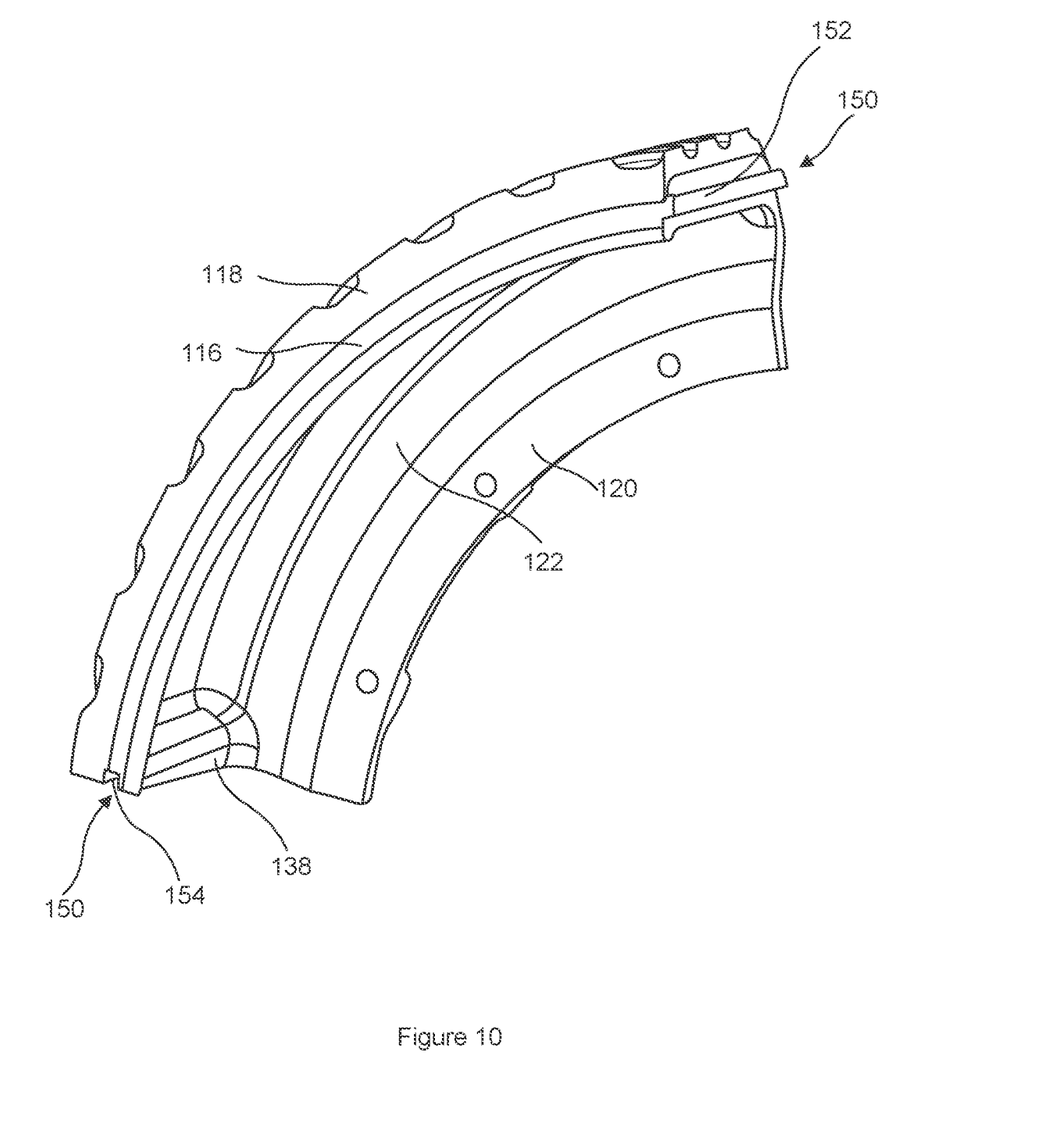
FIG. 10 is a further perspective view of the segment of FIG. 7.

In this example, the rim portion 118 includes a tread pattern 160 which may be for example molded or cut into the rim portion 118. The tread pattern 160 comprises a regular series of troughs 162 and peaks 164. The tread pattern 160 is arranged such that debris that may be caught between the rim portion 118 and a track when the wheel 110 is in use is ejected so as to avoid damage to the wheel 110, and a track which rides upon the wheel 110. The tread pattern 160 is so arranged that when the segments 114 are attached to one another to form a wheel 110, the tread pattern 160 continues uninterrupted over the interfaces of adjacent segments 114; this is best seen in FIG. 6 at reference 166. In other words, the tread pattern 160 can be profiled to be continuous once the segments 112 are assembled into a wheel 110.

The invention is not limited to the embodiments or examples described herein, and may be modified or adapted without departing from the scope of the present disclosure.

The invention claimed is:

1. A wheel for use with an endless track system, the wheel comprising:
    at least three substantially identical segments, wherein each of the segments comprises a support portion, a circumferential flange, and a rim portion;
    wherein the rim portion is affixed to an outer face of the circumferential flange;
    wherein the segments are attached to each other to form the wheel; and
    wherein the rim portion defines a plurality of angled grooves arranged such that at least one groove bridges an interface of two segments uninterrupted.

2. The wheel of claim 1, wherein the rim portion comprises an elastomer.

3. The wheel of claim 1, wherein the rim portion is bonded to the outer face.

4. The wheel of claim 1, wherein each segment defines an inner edge configured for attachment to a hub portion or an axle flange.

5. The wheel of claim 4, wherein the inner edge is configured to be bolted to the hub portion or axle flange.

6. The wheel of claim 1, wherein each segment is configured to be bolted to each adjacent segment.

7. The wheel of claim 1, wherein each segment includes corresponding interlocking formations configured to join each segment to an adjacent segment.

8. The wheel of claim 1, wherein each segment further comprises an inner face, and wherein the inner face is provided with a debris ejection formation at the interface of two segments.

9. The wheel of claim 1, wherein the rim portion further comprises an exterior face for contact with an endless track, wherein the exterior face comprises the plurality of grooves, and wherein the plurality of grooves are configured to eject debris caught between the wheel and the endless track.

10. A segmented wheel, comprising:
    at least three substantially identical wheel segments, each having a support portion connected to an arcuate flange, and a rim portion affixed to an outer face of the flange, the rim portion defining a plurality of angled grooves arranged such that at least one groove bridges an interface of two segments uninterrupted.

11. The segmented wheel of claim 10, wherein the rim portion comprises an elastomer.

12. The segmented wheel of claim 10, wherein each of the at least three wheel segments is configured to interlock with another of the at least three wheel segments.

13. A method of forming a wheel, the method comprising:
providing at least three substantially identical wheel segments comprising a support portion and a circumferential flange;
affixing a rim portion to an outer face of the circumferential flange, the rim portion defining a plurality of angled grooves; and
connecting the wheel segments together to form a substantially circular wheel, such that at least one groove bridges an interface of two segments uninterrupted.

14. The method of claim 13, wherein affixing the rim portion to the outer face of the circumferential flange comprises molding an elastomer to the circumferential flange.

15. The method of claim 13, wherein affixing the rim portion to the outer face of the circumferential flange comprises pressing an elastomer to the circumferential flange.

16. The method of claim 13, wherein connecting the wheel segments together comprises interlocking the wheel segments.

17. The method of claim 13, further comprising bolting each wheel segment to two adjacent segments.

18. The method of claim 13, further comprising bolting each wheel segment to a hub.

* * * * *